United States Patent
Evertt et al.

(10) Patent No.: US 10,460,445 B2
(45) Date of Patent: *Oct. 29, 2019

(54) OBJECT DIGITIZATION

(71) Applicant: MICROSOFT TECHNOLOGY LICENSING, LLC, Redmond, WA (US)

(72) Inventors: Jeffrey Jesus Evertt, Kirkland, WA (US); Justin Avram Clark, Kirkland, WA (US); Christopher Harley Willoughby, Kenmore, WA (US); Mike Scavezze, Bellevue, WA (US); Joel Deaguero, Snohomish, WA (US); Relja Markovic, Seattle, WA (US); Joe Sola, Seattle, WA (US); David Haley, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/945,108

(22) Filed: Apr. 4, 2018

(65) Prior Publication Data

US 2018/0225829 A1  Aug. 9, 2018

Related U.S. Application Data

(60) Continuation of application No. 14/844,821, filed on Sep. 3, 2015, now Pat. No. 9,953,426, which is a
(Continued)

(51) Int. Cl.
*H04N 13/257* (2018.01)
*G06T 7/12* (2017.01)
(Continued)

(52) U.S. Cl.
CPC .............. *G06T 7/12* (2017.01); *A63F 13/213* (2014.09); *A63F 13/53* (2014.09); *G06T 7/50* (2017.01);
(Continued)

(58) Field of Classification Search
CPC .... H04N 13/0271; G06T 7/0051; G06T 15/08
See application file for complete search history.

(56) References Cited

U.S. PATENT DOCUMENTS

2004/0042662 A1* 3/2004 Wilensky ............... G06K 9/342
382/194
2004/0247176 A1  12/2004 Aucsmith et al.
(Continued)

FOREIGN PATENT DOCUMENTS

| JP | 2003345840 A | 12/2003 |
| JP | 2006214893 A | 8/2006 |

OTHER PUBLICATIONS

"Office Action Issued for Japan Patent Application No. 2014-514566", dated Mar. 24, 2016, 11 Pages.
(Continued)

*Primary Examiner* — Tsion B Owens
(74) *Attorney, Agent, or Firm* — Shook, Hardy & Bacon LLP

(57) ABSTRACT

To digitize an object, a camera captures images of different sides of the object with color and depth data. At least two different sides of the object are identified from the images, and constructions are created of the sides of the object from the images. Points of the constructions to connect to one another are determined and used to align the constructions. The construction are merged to generate a rendition of the object. Various techniques are applied to extrapolate edges, remove seams, extend color intelligently, filter noise, apply skeletal structure to the object, and optimize the digitization
(Continued)

further. The rendition of the object can be provided for display as a digital representation of the object and potentially used in different applications (e.g., games, Web, etc.).

20 Claims, 18 Drawing Sheets

Related U.S. Application Data division of application No. 13/410,907, filed on Mar. 2, 2012, now Pat. No. 9,208,571.

(60) Provisional application No. 61/493,844, filed on Jun. 6, 2011.

(51) Int. Cl.
| | |
|---|---|
| *H04N 13/271* | (2018.01) |
| *H04N 5/222* | (2006.01) |
| *G06T 19/20* | (2011.01) |
| *A63F 13/213* | (2014.01) |
| *A63F 13/53* | (2014.01) |
| *G06T 15/08* | (2011.01) |
| *G06T 7/70* | (2017.01) |
| *G06T 7/50* | (2017.01) |
| *H04N 13/268* | (2018.01) |

(52) U.S. Cl.
CPC ............... *G06T 7/70* (2017.01); *G06T 15/08* (2013.01); *G06T 19/20* (2013.01); *H04N 5/2226* (2013.01); *H04N 13/257* (2018.05); *H04N 13/268* (2018.05); *H04N 13/271* (2018.05); *A63F 2300/1093* (2013.01); *A63F 2300/6018* (2013.01); *G06T 2200/08* (2013.01); *G06T 2207/10004* (2013.01); *G06T 2207/10028* (2013.01); *G06T 2219/2012* (2013.01)

(56) References Cited

U.S. PATENT DOCUMENTS

| | | | |
|---|---|---|---|
| 2010/0033617 A1* | 2/2010 | Forutanpour | G06T 7/564 348/345 |
| 2011/0025689 A1* | 2/2011 | Perez | A63F 13/213 345/420 |
| 2011/0175984 A1* | 7/2011 | Tolstaya | G06K 9/38 348/46 |
| 2011/0255746 A1* | 10/2011 | Berkovich | G06K 9/00214 382/103 |

OTHER PUBLICATIONS

"Office Action Issued in Korean Patent Application No. 10-2013-7032547", dated Feb. 11, 2019, 11 Pages.

* cited by examiner

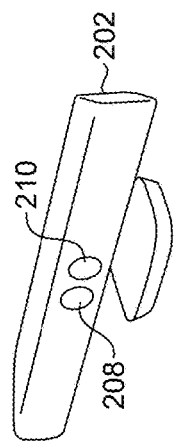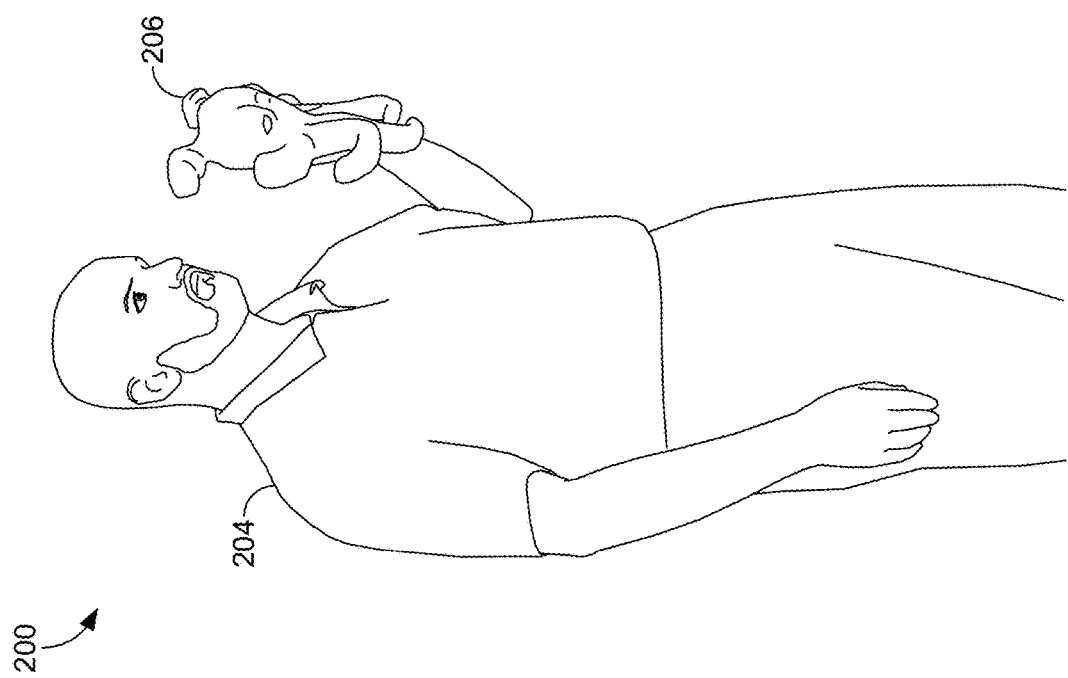
FIG. 2

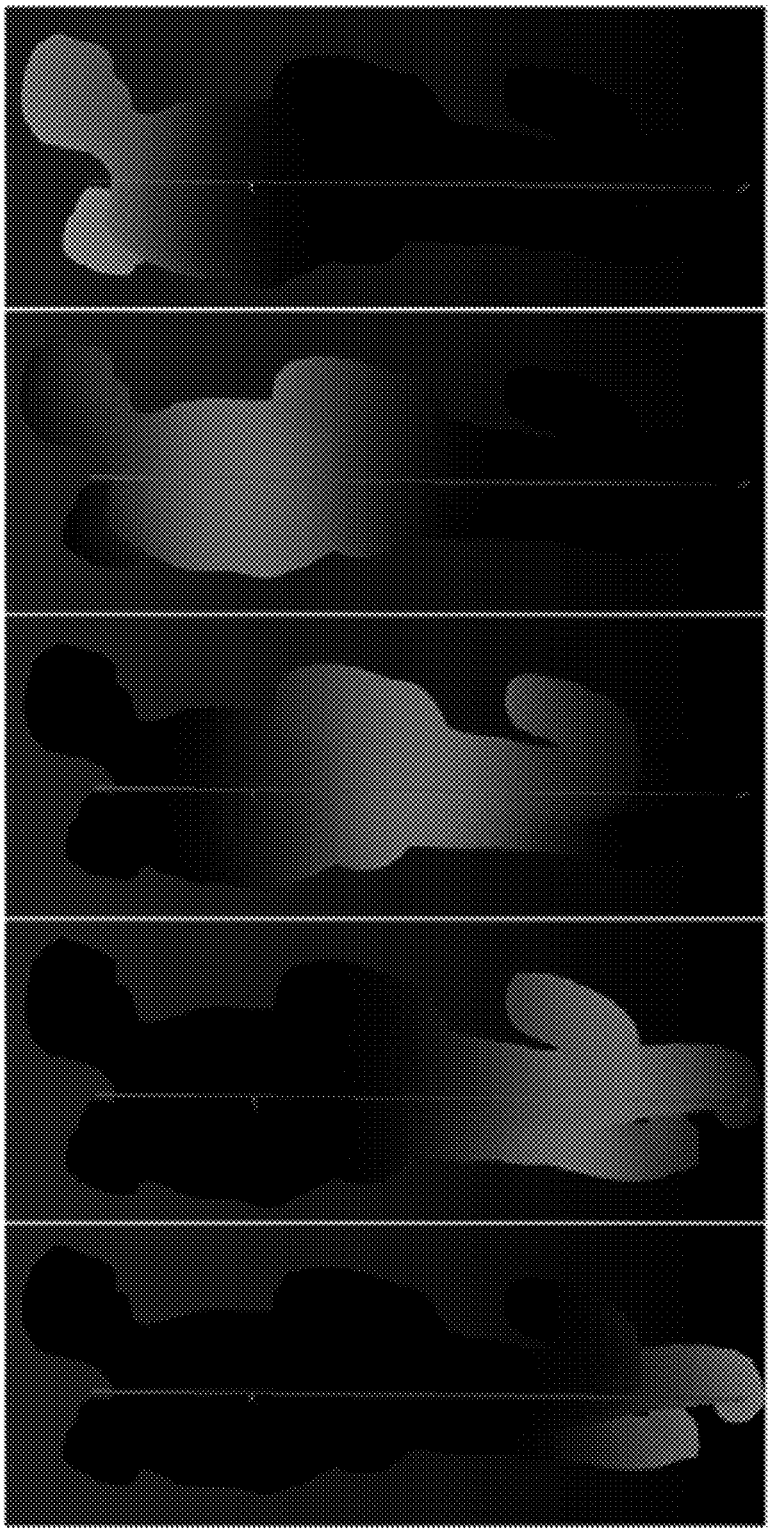

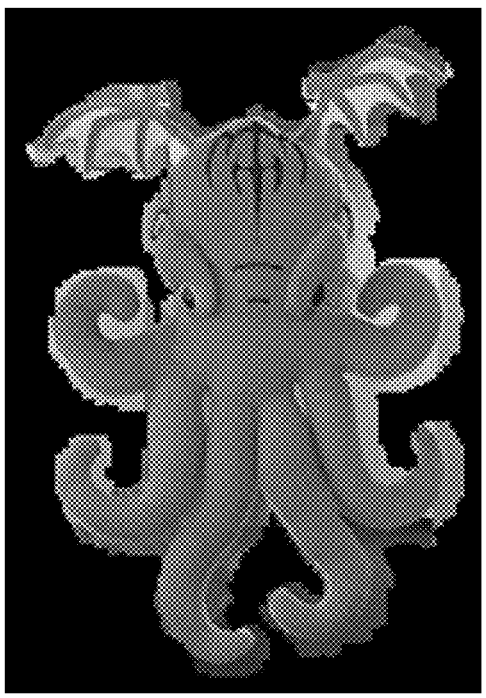
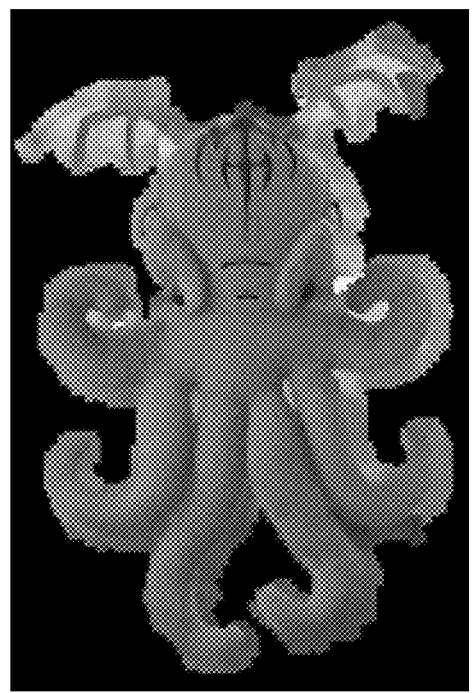
FIG. 20A  FIG. 20B
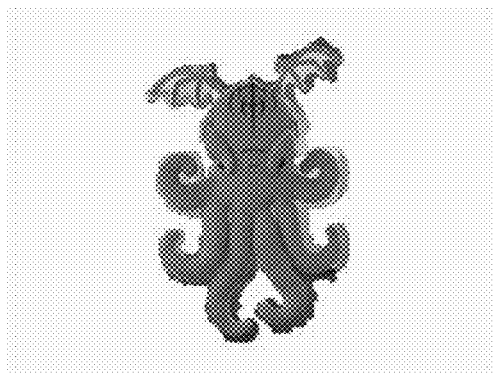
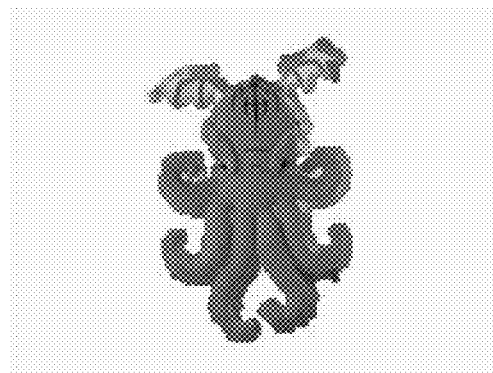
FIG. 21A  FIG. 21B

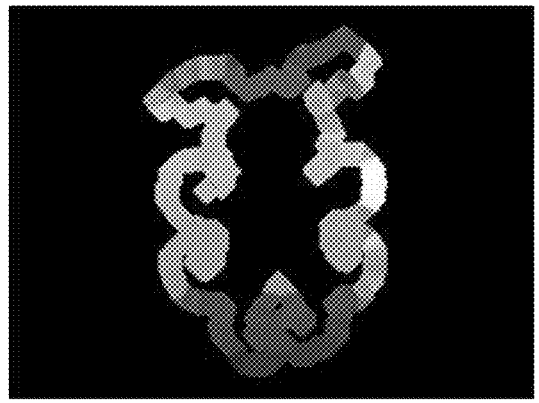 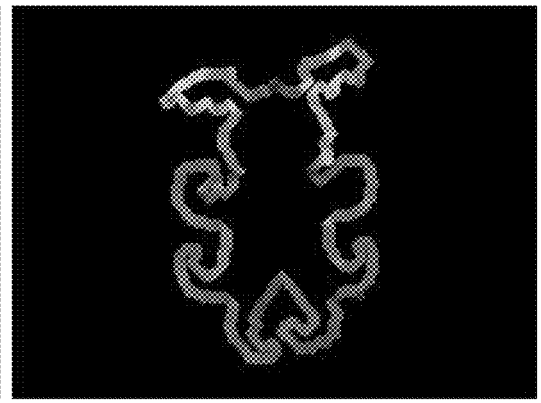
FIG. 22A  FIG. 22B
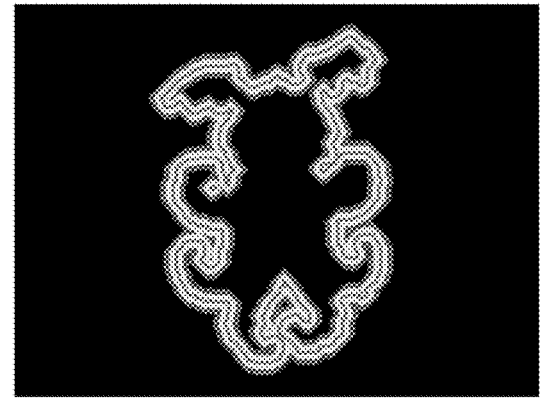 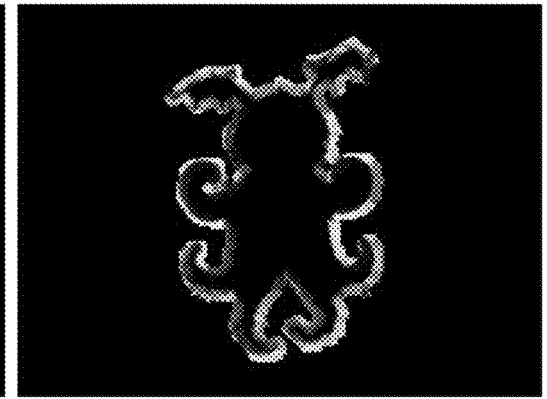
FIG. 23A  FIG. 23B

OBJECT DIGITIZATION

RELATED APPLICATIONS

This patent application is a continuation of U.S. application Ser. No. 14/844,821, filed Sep. 3, 2015, which is a divisional application of U.S. application Ser. No. 13/410,907, filed Mar. 2, 2012 (issued as U.S. Pat. No. 9,208,571), which claims priority to U.S. Provisional Application No. 61/493,844, filed Jun. 6, 2011. Each of the aforementioned applications is herein incorporated by reference in its entirety.

BACKGROUND

Modern gaming and Internet technologies interact with users in far more personal ways than these technologies have in the past. Instead of simply hitting buttons on a controller connected to a game console, today's gaming systems can read movements of players standing in front of cameras or actions players take with wireless controllers (e.g., swinging a controller like a baseball bat). This personal interaction opens up an entire new realm of gaming.

SUMMARY

This summary is provided to introduce a selection of concepts in a simplified form that are further described below in the Detailed Description. This summary is not intended to identify key features or essential features of the claimed subject matter. Nor is this summary intended to be used as an aid in determining the scope of the claimed subject matter.

One aspect is directed to creating a digital representation (a "digitization") of an object in an image. To digitize an object, a camera captures images of different sides of the object with color and depth data. At least two different sides of the object are identified from the images, and constructions are created of the sides of the object from the images. Points of the constructions to connect to one another are determined and used to align the constructions. The construction are merged to generate a rendition of the object. Various techniques are applied to extrapolate edges, remove seams, extend color intelligently, filter noise, apply skeletal structure to the object, and optimize the digitization further. The rendition of the object can be provided for display as a digital representation of the object and potentially used in different applications (e.g., games, Web, etc.).

BRIEF DESCRIPTION OF THE DRAWINGS

Illustrative embodiments of the present invention are described in detail below with reference to the attached drawing figures, and wherein:

FIG. 2 is a diagram of a user presenting an object for digitization, according to one embodiment.

FIGS. 19A-19E are diagrams illustrating weighting added to the different bones of a generated skeletal structure, according to one embodiment.

FIGS. 20A and 20B are diagrams illustrating before and after luma/chroma processing, according to one embodiment.

FIGS. 21A and 21B are diagrams illustrating source and output images after edges are filtered, according to one embodiment.

FIGS. 22A and 22B are diagrams illustrating images where the edge repair filter finds background colors and target object colors, according to one embodiment.

FIGS. 23A and 23B is a diagram of images showing distance from an edge to a disputed region and calculated background likelihood values, according to one embodiment.

DETAILED DESCRIPTION

Figure 1:
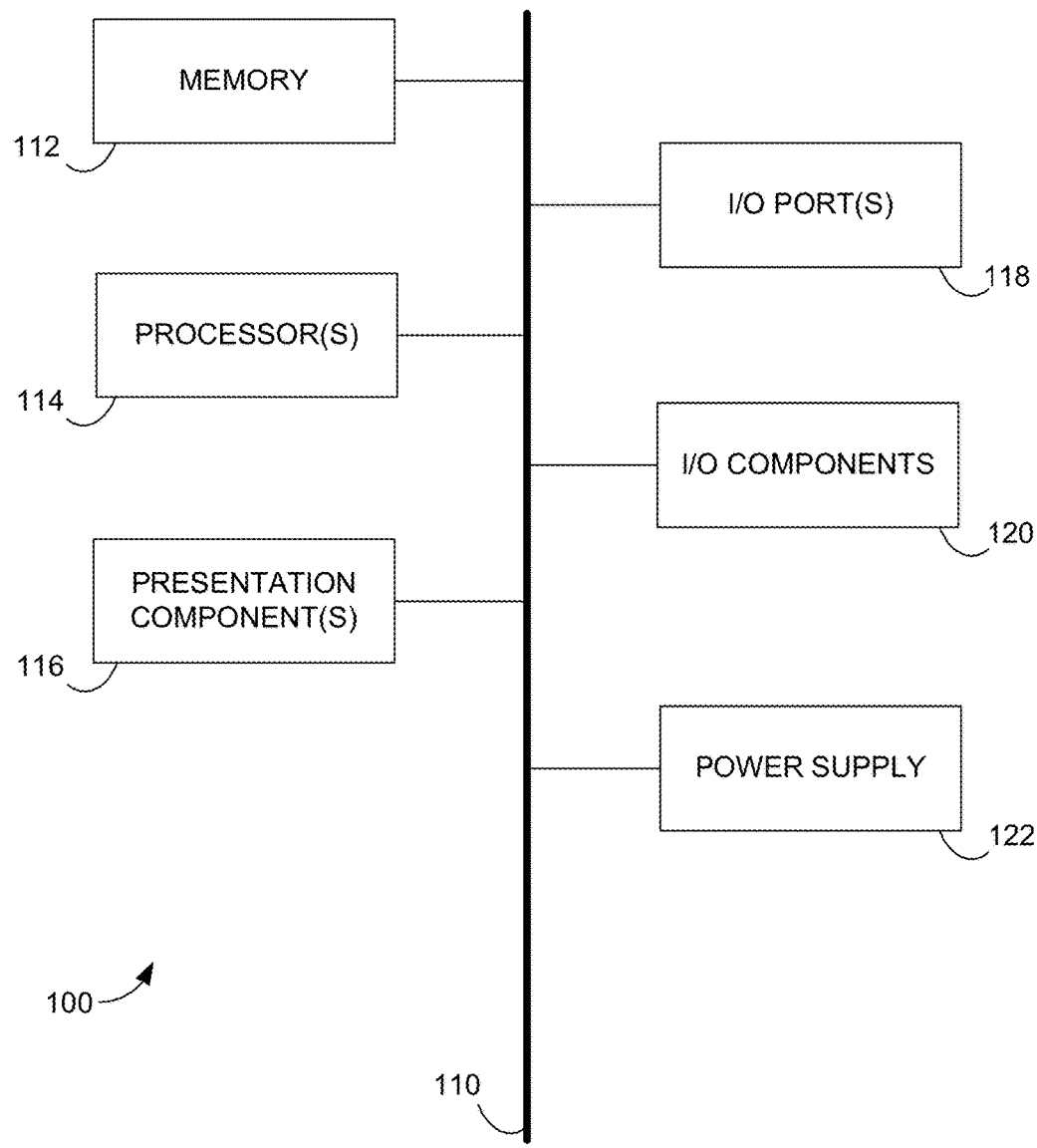
FIG. 1 is a block diagram of an exemplary computing environment suitable for implementing embodiments discussed herein.

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments described herein generally relate to creating a digital representation of an object captured by a camera. In one embodiment, a user holds the object in front of the camera, the camera captures an image of the object, and a device digitizes the captured object into a 3D rendition that can be displayed digitally—for instance, as an entity in a video game.

To illustrate, consider the following example. A user holds up a toy octopus to a gaming device equipped with a camera. Using the camera, the gaming device takes pictures of the front and back of the object, capturing both color and depth data for each side. Based on the depth data, a 3D rendition of the octopus is constructed, and the color data is then added to the 3D rendition to create a digital rendition (referred to herein as a "digitization") of the octopus. The digitization can then be used in games or any other software or web application where display of the octopus is useful.

At least one embodiment is directed towards digitizing an object. A user presents the object to a camera on a computing device (such as a gaming console). The device may instruct the user to position the object for display to optimize captured images—e.g., by placing an outline on a screen reflecting the image being seen by the camera and indicating that the user should move the object into the outline. Eventually, the device captures an image, or images, of the object. The user may then be instructed to present the backside of the object to the camera for capturing. The device may then capture an image, or images, of the backside of the object. The captured front and back images are processed to construct a 3D digitization of the object.

In one embodiment, processing uses depth data of the images captured by the camera. Depth data describes the proximity of things captured in the images in a per-pixel or other spatial representation. Using the depth data, the closest point of an object in the image is located. This embodiment assumes that the closest object an image is the object the user is looking to capture—e.g., a user holding an octopus to camera would likely mean that the octopus is the closest thing to the camera.

Having briefly described in an overview of the present invention, an exemplary operating environment in which various aspects of the present invention may be implemented is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialty computing devices, and the like. Embodiments of the invention may also be practiced in distributed computing environments where tasks may be performed by remote-processing devices that may be linked through a communications network.

With continued reference to FIG. 1, computing device 100 includes a bus 101 that directly or indirectly couples the following devices: memory 102, one or more processors 103, one or more presentation components 104, input/output (I/O) ports 105, I/O components 106, and an illustrative power supply 107. Bus 101 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterates that the diagram of FIG. 1 is merely illustrative of an exemplary computing device that can be used in connection with one or more embodiments of the present invention. Distinction is not made between such categories as "workstation," "server," "laptop," "gaming console," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer-storage media and communication media. Computer-storage media includes both volatile and nonvolatile, removable and non-removable media implemented in any method or technology for storage of information such as computer-readable instructions, data structures, program modules or other data. Computer-storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, or any other medium that can be used to encode desired information and which can be accessed by the computing device 100.

The memory 102 includes computer-storage media in the form of volatile and/or nonvolatile memory. The memory 102 may be removable, non-removable, or a combination thereof. Exemplary hardware devices include solid-state memory, hard drives, optical-disc drives, etc. The computing device 100 includes one or more processors that read data from various entities such as the memory 102 or the I/O components 106. The presentation component(s) 104 present data indications to a user or other device. Exemplary presentation components include a display device, speaker, printing component, vibrating component, and the like.

The I/O components 106 may comprise a camera capable of taking static pictures or video. In one embodiment, the camera, when taking a picture, captures color data (e.g., red, green, blue) and depth data. Depth data indicates the proximity—in one embodiment, on a per-pixel basis—of objects being captured by the camera to the camera itself. Depth data may be captured in a number of ways, like using an infrared (IR) camera to read projected IR light, reading projected laser light, or the like. Depth data may be stored in a per-centimeter, per-meter, or other spatial representation. For example, IR dots may be projected and read by an IR camera, producing an output file that details the depth of an image in an area directly in front of the camera, measured in a per-meter orientation. Additionally, depth data may also indicate the orientation of a particular part of a captured object by recording the pixels of screen area where depth is measured. Because the color camera and the depth camera may be located separately from one another, conversions may be made to map retrieved color data to corresponding depth data.

The I/O ports 118 allow the computing device 100 to be logically coupled to other devices including the I/O components 120, some of which may be built in. Illustrative I/O components 120 include a microphone, joystick, game pad, satellite dish, scanner, printer, wireless device, and the like.

As indicated previously, some embodiments are directed to creating a digital rendition of an object in a virtual environment. FIG. 2 is a diagram of an environment 200 for a user 204 to create a digital representation of an object 206, according to one embodiment. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Focusing on FIG. 2, environment 200 shows user 204 presenting the object 206, illustrated as octopus figurine, to a computing device 202, which is equipped with two cameras: color camera 208 and depth camera 210. In environment 200, computing device 202 is a game console, such as the Microsoft Kinect™ created by the Microsoft Corporation®. The cameras on computing device 202 capture one or more images that include the object 206. Color camera 208 captures color data for images, and depth camera 210 captures depth data. In alternative embodiments, computing device 202 may only have one camera that captures both color and depth data.

While shown as a standalone device, computing device 202 may be integrated or communicatively connected to other computing devices (e.g., gaming consoles, servers, etc.). The components of the computing system 200 may communicate with each other via a network, which may include, without limitation, one or more local area networks (LANs) and/or wide area networks (WANs). Such networking environments are commonplace in offices, enterprise-wide computer networks, intranets and the Internet. It should be understood that some embodiments may include additional computing devices 202. Each may comprise a single device/interface or multiple devices/interfaces cooperating in a distributed environment.

In some embodiments, one or more of the digitization techniques described herein may be implemented by stand-alone applications. Alternatively, one or more of the digitization techniques may be implemented by disparate computing devices across a network, such as a the Internet, or by a module inside a gaming system. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of servers or client computing devices.

While user 204 is shown in FIG. 2 as presenting the front-side of object 206 to computing device 202, user 204 may present the backside of the object 206 to computing device 202 so a backside image of object 206 can be captured. The backside image can then be combined with a front side image of object 206 to produce a 3D rendition of object 206. Each captured image may include color and depth data, both of which allow computing device 202 to accurately create a 3D rendition of object 206.

Additional image views of object 206 may also be used, in different embodiments, to aid digitization. Object 206 may be photographed or videoed from any different angle. For example, several images may be taken from the right, left, bottom, and top of object 206 in addition to—or in lieu of—front and back views in order to generate a more robust 3D digitization. For example, several side views may be used in digitizing a particular side of object 206. At least in embodiment, the more the views of object 206 used, the more complete or accurate a 3D rendition.

Figure 3:
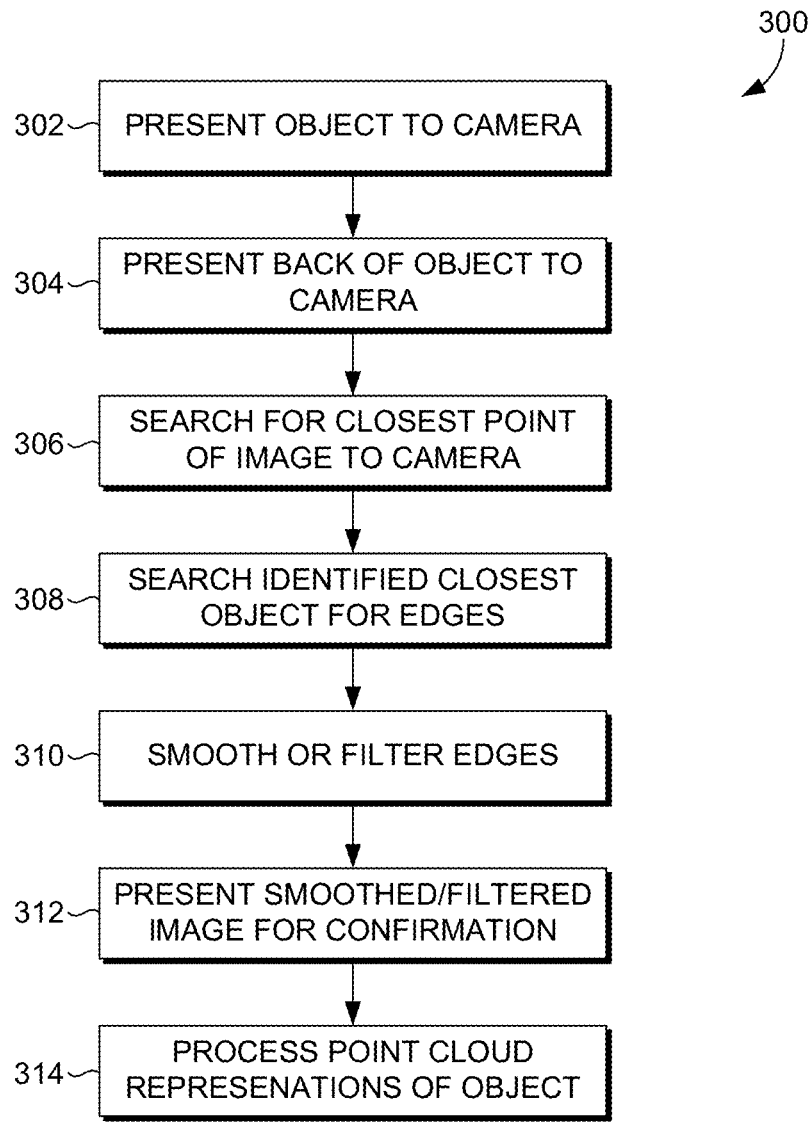
FIG. 3 is a diagram of a work flow for digitizing an object, according to one embodiment.

FIG. 3 is a diagram of a work flow 300 for digitizing an object, according to one embodiment. Initially, a user presents the object to a camera on a computing device to images taken, as shown at 302. The computing device may, in some embodiments, instruct the user to move the object into a specific area in order to capture an optimal image of the image—for example, asking providing an outline on a display, showing a real-time image of the user and the object, and then instructing the user to move the object into the outline. Once an initial image is taken, the computing device may instruct the user to present the backside of the object for capturing, as shown at 304. Guidance for capturing the backside may similarly be provided by the computing device. For each image captured, color and depth data are stored and used to digitize the object being presented. Moreover, multiple images may be captured for the front and backside perspectives of the object. For example, the computing device may be configured to take ten front images and ten back images, and possibly merge the front ten together and the back ten together—or use all twenty to digitize the image. While ten images have shown to be an ideal number of images to digitize an object, other embodiments may use different numbers of captured images.

Once front and back images of the object are captured by the camera, one embodiment begins digitizing the object by searching—using depth data of the images—for the closest point in the image to the camera, as shown at 306. The user is probably holding the object to be digitized in front of the user, so it the object should be closer to the camera than anything else. Turning back to FIG. 2 for a second, one may notice that user 204 is holding the object 206 in front of him and thus closer to the computing device 202. Locating the closest object in the image may be accomplished using the depth data associated with the image, and some embodiments perform the process on both front and backside images to identify the closest object in both.

As indicated at 308, the closest objects identified in the images are then searched for edges to identify where the objects end. Depth data is again used to locate the edges of objects in the image. Edge searching may commence outwardly from the closest point, looking for drastic differences in the depths of points. For example, the edge of the octopus in FIG. 2 may have a point that is nearly half a meter closer than an adjacent point representing user 204's shoulder. Such a drastic difference represents a readable signal that the adjacent point is not part of the object and thus should not be included in further digitization steps. Locating all the edges of an object in such a manner allows the computing device to identify the object in the image.

Once the object is determined, one embodiment switches off the color data associated with the rest of the image (i.e., the portion of the image not identified as the object). It may be necessary in some embodiments to capture multiple images (e.g., ten images of the front and ten of the back of the object), so a smoothing technique may be required to blend the found edges between frames, as shown at 310. For example, the object may have moved between frame one and frame four so smoothing the edges between the frames may be necessary to get an accurate representation of the object. Additionally, noise, low resolution, and imperfections in depth-to-color registration may also necessitate additional smoothing and/or filtering of the edges.

In one embodiment, the resultant smoothed and/or filtered object is presented to the user for confirmation, as shown at 312. The user can then accept or reject the resultant object. If accepted, additional processing may then proceed to digitize the object. If rejected, embodiments may ask the user to begin the process over by taking new pictures of the object, or may simply re-smooth or re-filter the object.

Figure 11:
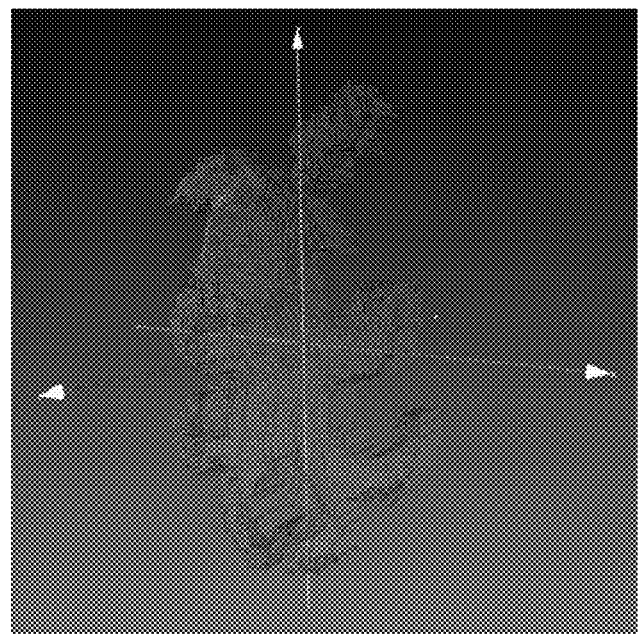
FIG. 11 is a diagram of a three-dimensional (3D) point cloud construction of an object, according to one embodiment.

Eventually, the front and back images are used to generate a point cloud construction of the object in 3D. A "point cloud construction," shown in detail in FIG. 11 is a mapping of the front and/or back images of the object into 3D space, with the depth of each point or pixel of the object identified. The point cloud construction may be used in further digitization of the object. Although, alternative embodiments may use other representations or spatial aggregates of depth and color data to create constructions or other types of representations of the object from different images.

Figure 4A:
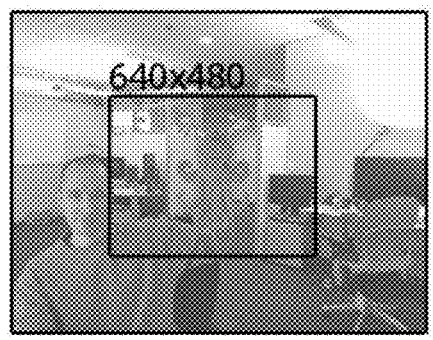
FIGS. 4A and 4B are diagrams of camera-view perspectives of a user presenting an object for digitization, according to one embodiment.
Figure 4B:
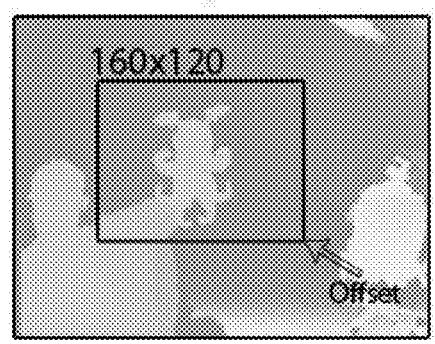

FIGS. 4-26 show images of various steps in the digitization process and will be discussed in further detail below to illustrate the processing used by different embodiments. Specifically, FIGS. 4A and 4B are diagrams of camera-view perspectives of a user presenting an object for digitization, according to one embodiment. In the illustrated embodiment, two views of the object are captured. The color camera is zoomed in on the center of the frame to get a 640×480 color window around the target object, and the corners of the color window are then transformed into depth frame coordinates (assuming the corners are at the front of the target object). A matching 160×120 window is then grabbed from the depth frame. Without this per-frame window adjustment (dependent on the distance of the target object to the camera), the depth and color windows may not overlap as fully as possible. Moreover, raw color and depth may be captured without performing depth-to-color or color-to-depth registration. The resolution numbers and windows are merely provided for illustrative purposes, as various other resolutions may alternatively be used.

Figure 5:
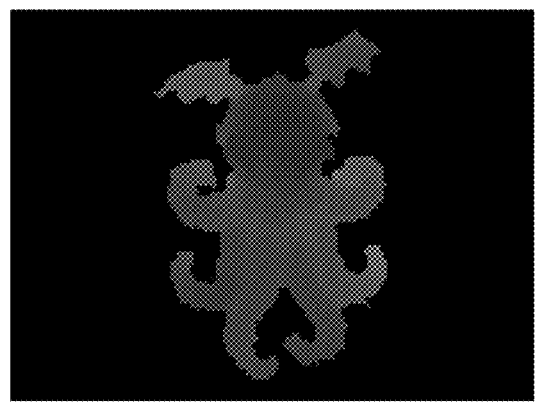
FIG. 5 is a diagram of a segmented depth image usable to digitize an object, according to one embodiment.

In one embodiment, the depth image is segmented to the target object. To do so, the closest depth pixel to the camera is searched for and found, assuming that such a point is on the target object. This embodiment then flood-fills outwardly from found closest point until depth edges (i.e., where depth is too far from the front of the object or we have no depth data) are hit. Additionally, points around high slope areas and with too few neighbors may be removed. The result is a mask of depth pixels that are on the target object (referred to herein as a "segmented depth image"), as shown in FIG. 5. The segmented depth image is stored in a ring buffer of depth frames (BAB/GOE shipped with a ring buffer size of 10), overwriting the oldest depth frame and averaging all frames together to get a final depth image. In one embodiment, only segmented depth pixels contribute to the final average. As a result, noise is smoothed, resulting in a more stable object edge and improving scenarios where parts of the object are blinking in and out of the segmentation due to noise or poor IR reflecting materials.

Figure 6:
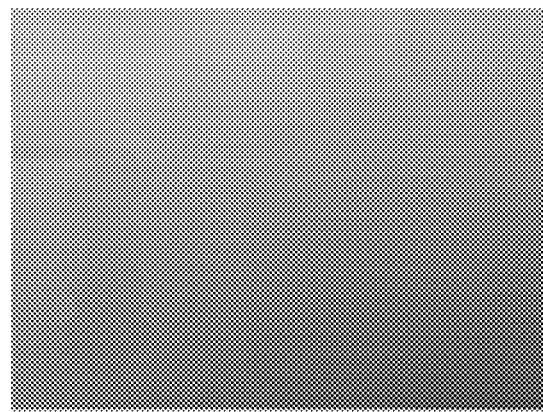
FIG. 6 is a diagram of depth-to-color offsets, according to one embodiment

FIG. 6 is a diagram of depth-to-color offsets, according to one embodiment. As illustrated, one embodiment builds a depth-to-color offset table with the green colors (shown in the uppermost, right corner), red colors (shown in the lower left corner), and blending of the two in between. The offsets between each pixel's depth and color space coordinates are stored in a table for rapid lookup during color segmentation and mesh processing, as well as to aid perfectly reproducing output meshes using only the two captured color images, regardless of the calibration settings of a particular camera. Regions of the table outside the object segmentation may be filled in by copying offsets at the edge of the segmentation outwards. The copied offset at the edge may be used later to handle cases when vertices in the output mesh projected into the depth image fall outside the bounds of the depth segmentation.

Figure 7:
FIG. 7 is a diagram of a source color image usable to digitize an object, according to one embodiment.
Figure 8:
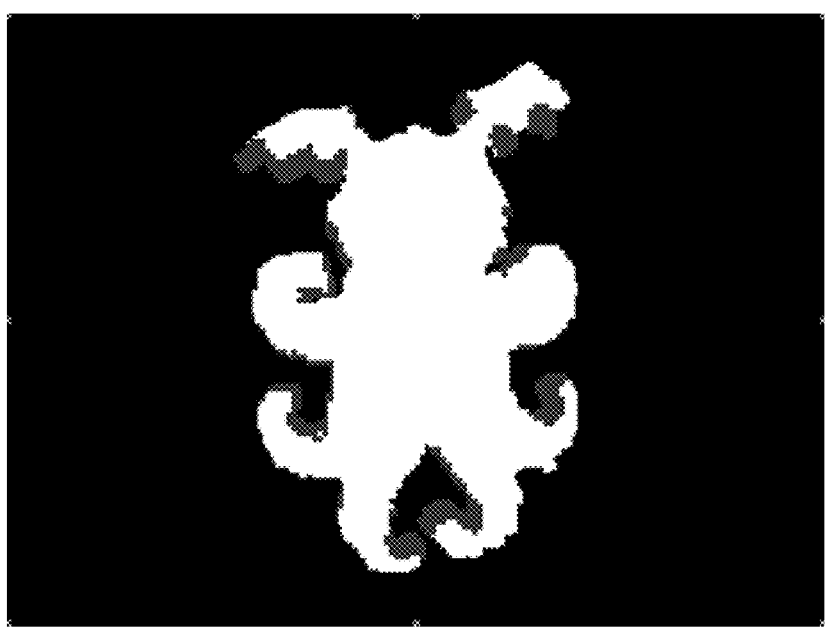
FIG. 8 is a diagram of a color segmentation of a captured object, according to one embodiment.

FIG. 7 is a diagram of a source color image, and FIG. 8 is a diagram of a color segmentation of a captured object, according to one embodiment. Starting with the segmentation in depth space, one embodiment splats each segmented depth pixel into a 320×240 color segmentation buffer, using a star-like splat pattern. The resultant pattern may then be "up-sampled" to 640×480, and a "distance-from-ideal" value, which describes how far the source depth pixel is from the "ideal" distance, is then computed for each segmented color pixel. The ideal distance represents how close to the camera the user should hold the target object in order to get as much color/depth data as possible—without intersecting the front clip plane of the depth camera. These values may be presented as feedback to the user during the capture process. Pixels further from ideal may be blurred and tinted more heavily than pixels closer to ideal. The distance-from-ideal values are eventually copied into the alpha channel of the color image used for real-time previewing.

Figure 9:
FIGS. 9 and 10 are diagrams of user interfaces (UIs) giving guidance for holding objects to be digitized, according to one embodiment.
Figure 10:
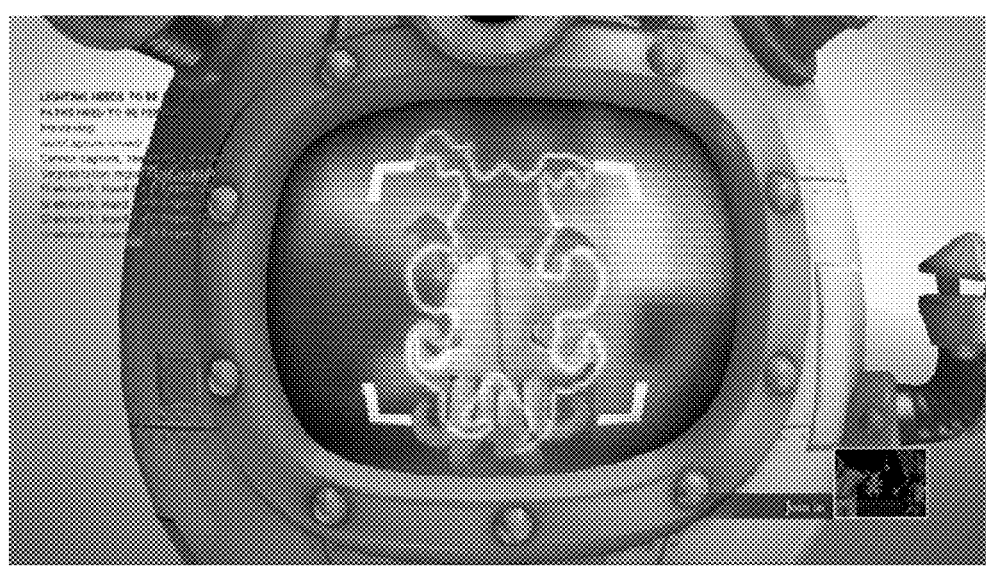

FIGS. 9 and 10 are diagrams of user interfaces (UIs) giving guidance for holding objects to be digitized, according to one embodiment. FIG. 9 shows that the illustrated embodiment analyzes the number of segmented pixels, distance to the camera, distance from the center of the camera view, pixel stability, and object size, and gives the user visual and text feedback on how to best position the object. The feedback may be in the form of an outline on a screen. FIG. 10 shows color and depth data of an image of the back of the target object, using the same process as above. One embodiment guides the user to orient the object correctly using the outline of the segmented front capture. The user may not have to match the outline precisely because front and back captures may later be aligned automatically.

FIG. 11 shows a point cloud construction, according to one embodiment. At this point two color and depth data images have been segmented to the target object. Using these images, a point cloud construction of points on the surface of the target object can be built and later used to reconstruct a triangle mesh. Segmented pixels in the front depth image are transformed into a "sheet" of 3D points. In one embodiment, positions are un-projected from depth image space into model space using depth data and the origin being the back-center of the sheet. The edges of the sheet are extruded backwards by adding additional points to form the sides of the object. To guess how "deep" the object is, in BAB/GOE, a fixed value for the extrude distance may be used.

Figure 12:
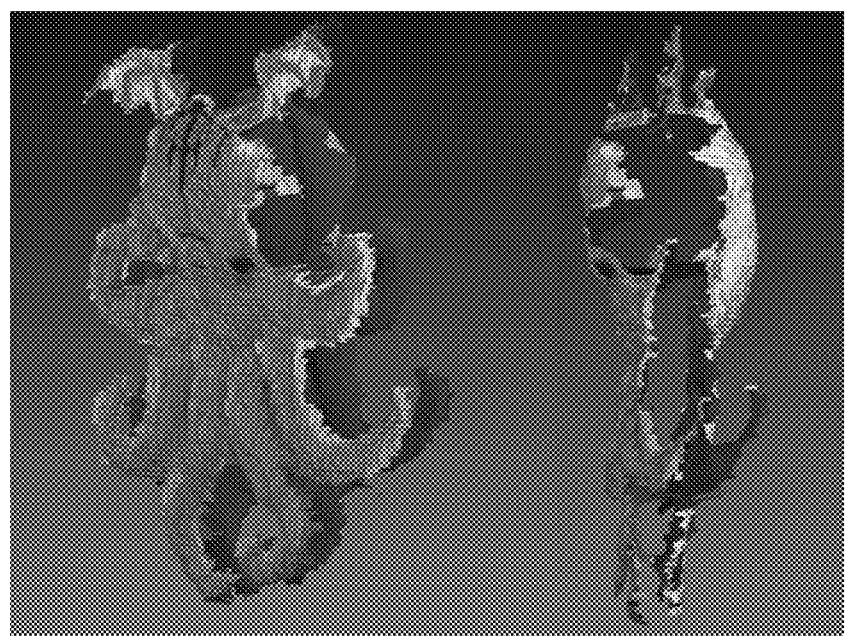
FIG. 12 is a diagram of two views of aligned point sheets, according to one embodiment.

Similarly, a sheet of 3D points from the back depth image is created, using the back-center of the front capture as the origin. FIG. 12 illustrates two views of aligned point sheets, according to one embodiment. To align the sheets, an initial transform is calculated to rotate this sheet 180 degrees around the up axis so that it forms the back of the point cloud. In one embodiment, another transform is calculated that aligns the edges of the front and back sheets as closely as possible. The alignment process may translate the back sheet to match the center of mass of the back sheet with center of mass of the front sheet. A brute-force iterate is then used over a range of translations and rotations to minimize an "alignment error" value, computed as the sum of the distances from each front edge point to its closest back edge point. The brute-force iterate may be done in multiple passes (with each pass attempting to compute the best value for each translation and rotation axis one at a time), and the search across each axis is done using a two-tier hierarchical approach for efficiency. Closest-point-finding is accelerated using a 3D cell space partition. One embodiment also implements an iterative closest point ("ICP") algorithm for fast fine-grained alignment, or alternatively, the need for better control may dictate use of only the brute-force method iterative.

Points from the front sheet that do not have corresponding points in the back sheet may be culled to search backwards from each front point to find the nearest back point. Likewise, points from the back sheet that do not have corresponding points in the front sheet may be culled. This removes parts of the sheet that are inconsistent between the front and back captures, as can happen if the user's hand is in the capture but has changed position between captures, or if the object has changed shape between front and back captures.

Figure 13:
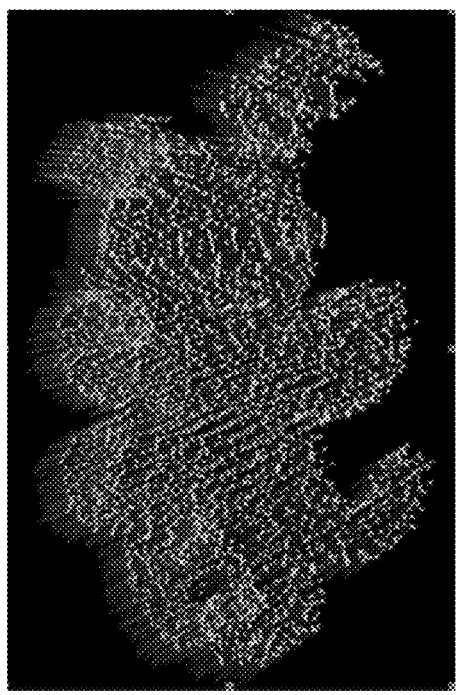
FIG. 13 is a diagram of a final point cloud construction, according to one embodiment.

In one embodiment, the remaining points are merged together into a final point cloud, and the normals for the points are computed using the plane formed by each point and its right and lower neighbors. FIG. 13 shows a final point cloud construction, according to one embodiment.

Figure 14:
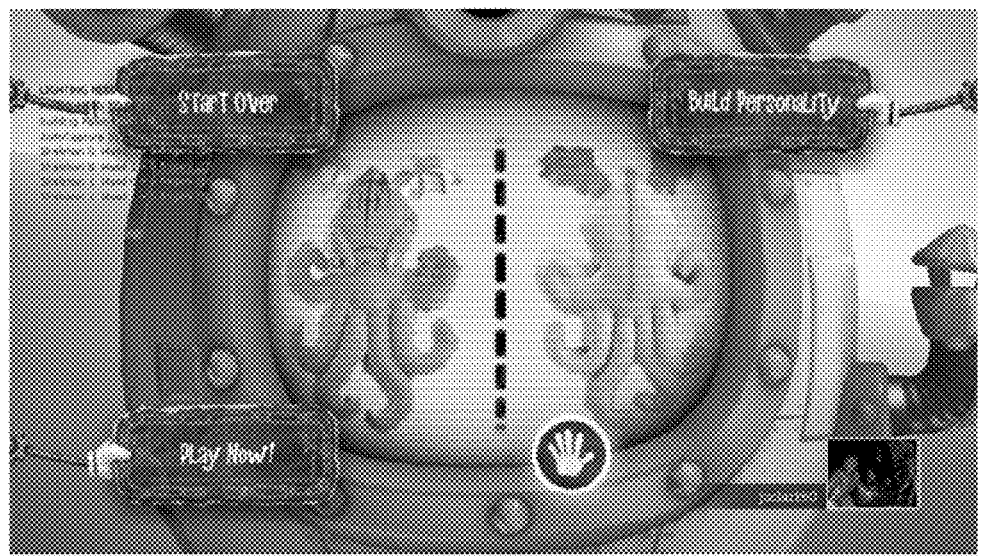
FIG. 14 is a diagram of a UI displaying a confirmation image of a digitized object displayed to a user, according to one embodiment.

A confirmation image may then be presented to the user, as shown in FIG. 14. The confirmation image incorporate the results of sheet alignment and point culling, allowing the user to detect cases when capture, alignment, or culling have failed badly and to re-capture without having to go through the remainder of the construction process. The image is created by projecting and splatting points in the final point cloud into the alpha channel of the front and back color images, rotating the back image based on the alignment transform, and doing some additional image cleanup.

Figure 15:
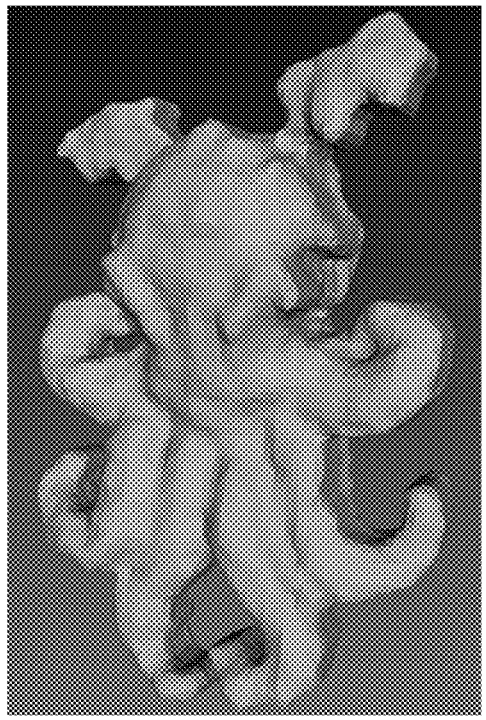
FIG. 15 is a diagram of a mesh output of a captured image, according to one embodiment.

A surface reconstruction step takes the final point cloud and generates a triangle mesh. FIG. 15 illustrates a diagram of a mesh output with surface reconstruction. One embodiment uses a hybrid CPU/GPU implementation of the Poisson Surface Reconstruction algorithm developed by Minmin Gong in Xin Tong's group at MSR-Beijing and detailed in "Poisson Surface Reconstruction," by Kazhdan, Bolitho, and Hoppe; and "Highly Parallel Surface Reconstruction" by Zhou, Gong, Huang, and Guo. This may be the most computationally intense part of digitization in both memory and time, taking, in some embodiments, 10-20 seconds for a typical point cloud data of approximately 20,000 points. The amount of hole-filling may be limited during reconstruction to keep memory usage under control, but such limiting can result in non-water-tight meshes if there are large holes in the point cloud.

Figure 16:
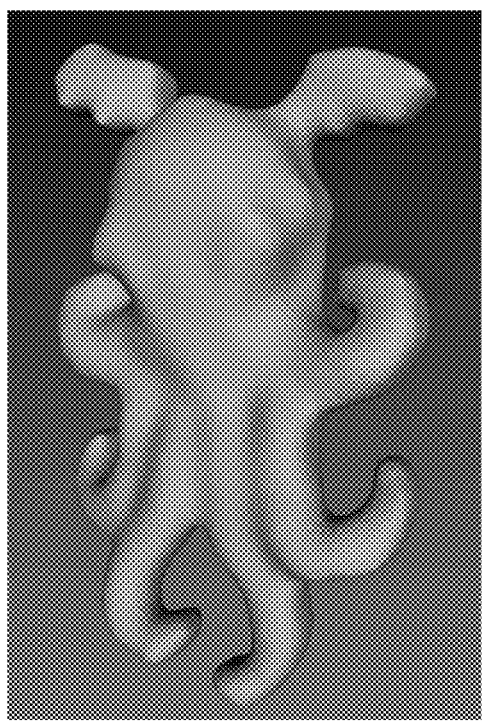
FIG. 16 is a diagram of a smoothed and processed image of an object, according to one embodiment.

FIG. 16 is a diagram of a smoothed and processed image of an object, according to one embodiment. Vertex adjacency lists are built and face and vertex normals are computed. Then, one embodiment uses a Laplacian algorithm to smooth some constraints. As a result, the sides of the object are rounded off, noise removed, and areas where the point sheets do not line up perfectly are cleaned up.

Depending on the quality of the point cloud, the surface reconstruction can create small "islands" of geometry instead of a single large mesh. One embodiment uses connected component labeling to find islands, compute their volumes, and remove islands that are significantly smaller than the largest island.

For each vertex, one embodiment looks at the dot product between that vertex's normal and the front and back capture view directions. The front view direction may be along the model-space negative Z axis, while the back view direction may depend on the results of the sheet alignment process and not along the positive Z axis. As a result, some vertices may be visible to both the front and back capture views, and some vertices may be visible to neither view. Some vertices may be classified as "front" if their normal is facing the front more than the back and vice versa. This also allows for location of the "seam" vertices (i.e. the vertices that straddle the front and back views of the object).

To create the texture map to apply onto the final mesh, one embodiment places a color image from the front capture at the top of the texture and the color image from the back capture directly under the front capture. Texels from the top part of the texture are then mapped onto the primarily front-facing triangles and vice versa for the primarily back-facing triangles. Vertices may initially be shared between front and back triangles right along the front-back seam, and later, these shared vertices may be duplicated so that to map different parts of the texture to front versus back triangles.

Figure 17:
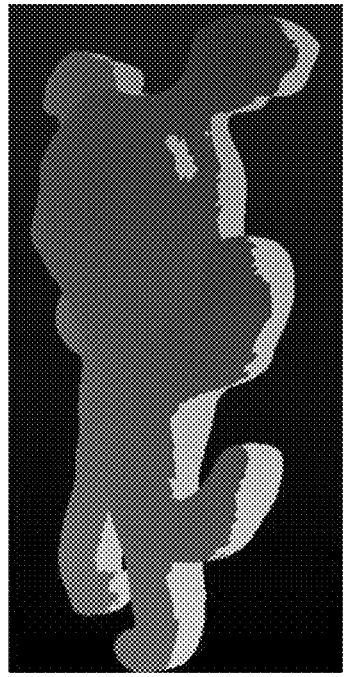
FIG. 17 is a diagram of an image with UV coordinates, according to one embodiment.
Figure 18:
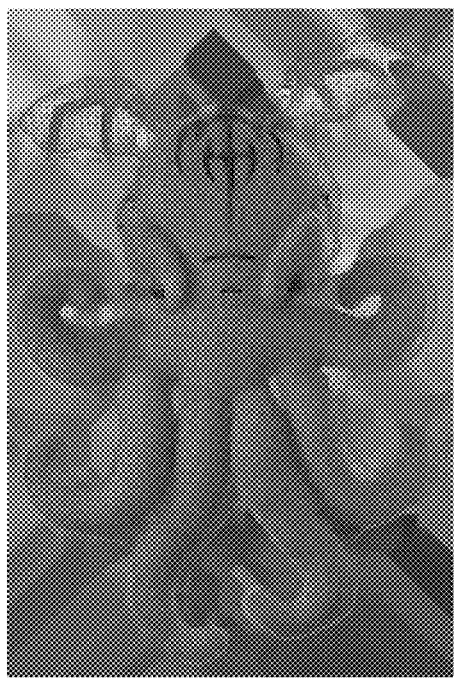
FIG. 18 is a diagram of front-facing triangle edges drawn into a section of a final texture map, according to one embodiment.

FIG. 17 illustrates a diagram of an image with UV coordinates, and FIG. 18 illustrates a diagram of front-facing triangle edges drawn into a section of a final texture map, according to one embodiment. To compute UV coordinate, front-facing triangles are mapped to the top part of the texture where placed the front capture color image is placed, and likewise for the bottom. Vertex positions are in the space of the depth camera; whereas, the color images are in the space of the color camera, so after projecting vertices onto the front/back depth images, one embodiment uses the depth-to-color offset table to transform coordinates into the color camera space.

In one embodiment, the mesh is re-centered, mirrored about the up axis, and scaled to enforce a maximum width/height aspect ratio. The captured color and depth images are mirrored compared to the real physical object, so another mirroring is used to reverse this. A skeleton may be optimized and animations may be added for taller rather than wider objects, so the width/height aspect ratio restriction puts a bound on artifacts caused by animating wide objects that do not match a certain skeleton.

In one embodiment, a single skeleton is used for all animations the skeleton. The skeleton may have bones to give a good range of motions (walking, jumping, crawling, dancing, looking left and right, etc.) without requiring the target object to have much more shape.

To apply skin to the digitized image, the mesh is rescaled and positioned such that skeleton fits inside of it, with the top bone positioned a certain percentage (e.g., approximately 90%) from the top of the object (placing it roughly inside the "head" of the object) and the bottom bone at the bottom extent of the object. Bone indices can then be computed and weights added to the skeleton by finding the closest bones along the up axis to each vertex and weighting to them using a falloff curve. FIGS. 19A-19E are diagrams illustrating weighting added to the different bones of a generated skeletal structure, according to one embodiment.

Color and/or depth images are processed to reduce noise and improve quality. Processing is done on the front and back images independently, in one embodiment, and the results are merged into a final texture map, which may require additional processing. After some experimentation and feedback from artists, the following steps were found to be optimal: convert sRGB colors to linear space, apply "grey world" auto-white balance, repair edge artifacts, compute luma and chroma values, apply bilateral filtering, histogram equalization, and sharpening to luma, apply median filtering to chroma, convert back to sRGB, and finally, extend the edges of the colors outwards into the de-segmented regions of the image. Other steps may be added and some of the above deleted in different embodiments.

FIGS. 20A and 20B show images before and after luma/chroma processing, according to one embodiment. Processing luma/chroma independently allows for filtering chroma much more strongly while preserving details in the luma image, which is good for de-noising the image. Histogram equalization may be applied very lightly to compensate for poorly exposed images.

FIGS. 21A and 21B show source and output images after edges are filtered, according to one embodiment. In one embodiment, an "edge repair filter" attempts to replace colors at the edges of the target object that are actually from the background and not the object itself. Bad colors may creep in due to the relatively low resolution and high noise of the depth image and imperfect depth-to-color registration. The edge repair filter operates on a "disputed region" of pixels directly around the object edge. Using the assumption that pixels interior to the disputed region are definitely part of the target object and pixels further exterior are part of the background, a "background likelihood" value is computed per disputed region pixel and used to blend high-likelihood-background pixels towards interior colors.

FIGS. 22A and 22B show images where the edge repair filter finds background colors and target colors, according to one embodiment. The target colors are extrapolated into a disputed region from the outside.

Figure 24:
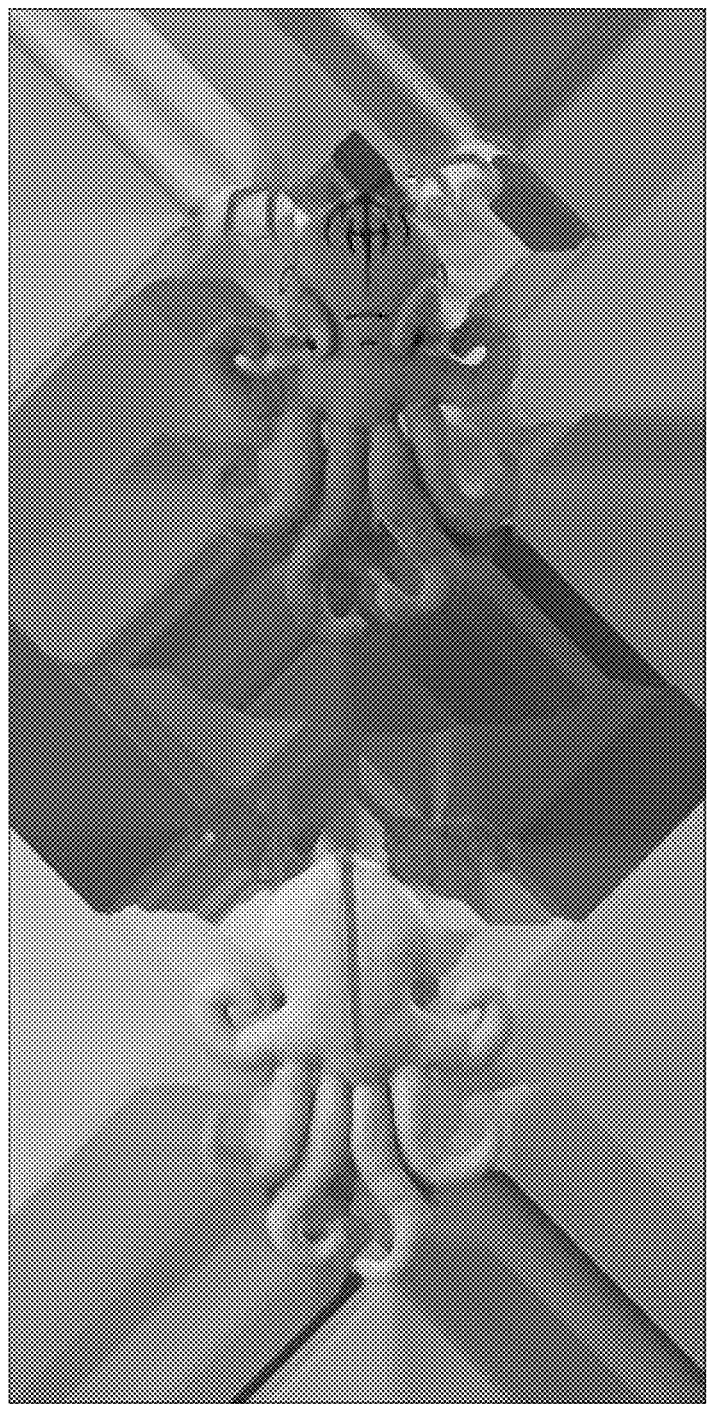
FIG. 24 is a diagram of a final composite texture map, according to one embodiment.

FIGS. 23A and 23B are images showing distance from an edge to a disputed region and calculated background likelihood values, according to one embodiment. Furthermore, FIG. 24 shows a final composite texture map of the image with texturing over tope of a non-finalized image, according to one embodiment.

Seams resulting from placing front and back images together may need to be repaired. The last bit of mesh processing is used to improve the appearance of the object near the front-back seam and in regions that were invisible to the color camera during capturing. First, a mask value per vertex is computed that represents how "bad" the texture color will be at that vertex. This value is the product of distance to the seam (where the front and back images touch but do not generally line up well) and how back-facing a vertex is to any of the captured images (where texture colors break down due to the surface facing away from the camera views and also from poor texel density). These values may be stored in a vertex color alpha channel. Next, a blurred version of the surface color is computed and stored into the vertex color RGB channels. These colors are fairly good in quality (although low in detail). The negative artifacts needing repair are relatively localized and of a higher frequency, where-as the blurring gives more global, low-frequency colors.

Figures 25A, 25B:
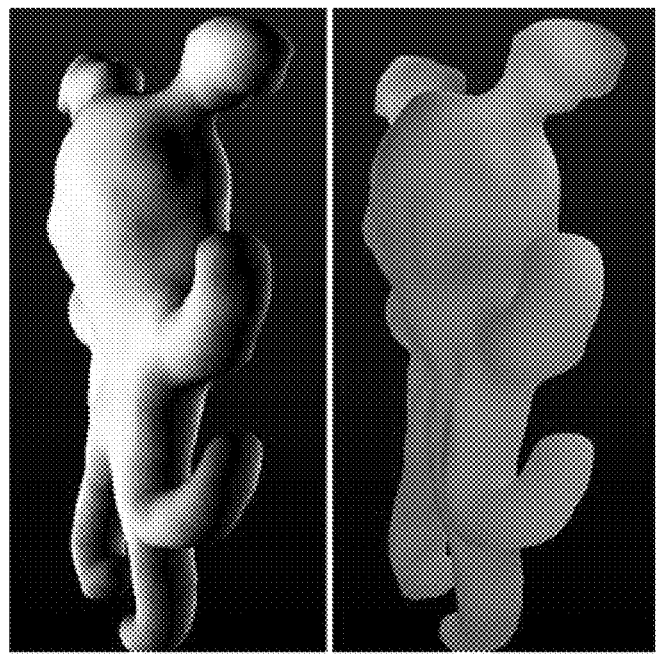
FIGS. 25A and 25B is a diagram of masked values and heavily blurred vertex colors, according to one embodiment.
Figures 26A, 26B:
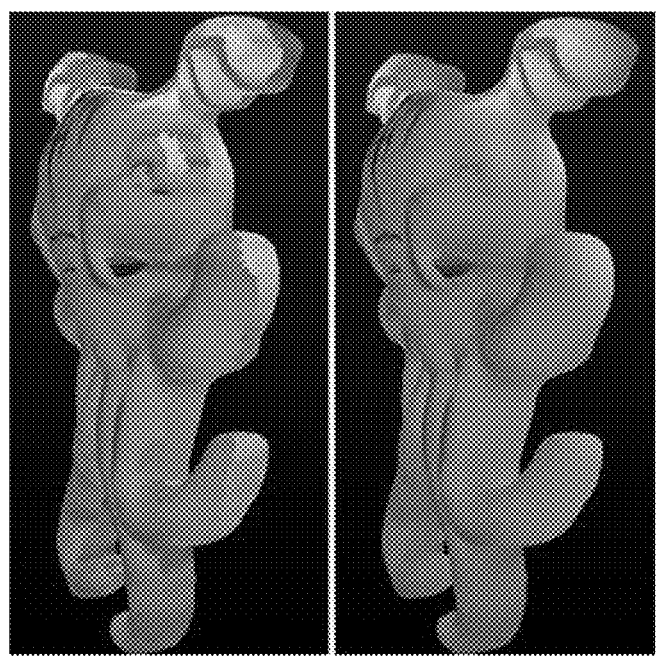
FIGS. 26A and 26B is a diagram of different meshes with texture only and texture with vertex color blending by mask value, according to one embodiment.

FIGS. 25A and 25B show masked values and heavily blurred vertex colors, according to one embodiment. At run-time, mask value is used to blend between the source texture and the blurred vertex color, in one embodiment. FIGS. 26A and 26B show different meshes with texture only (26A) and texture with vertex color blending by mask value (26B), according to one embodiment.

Figure 27:
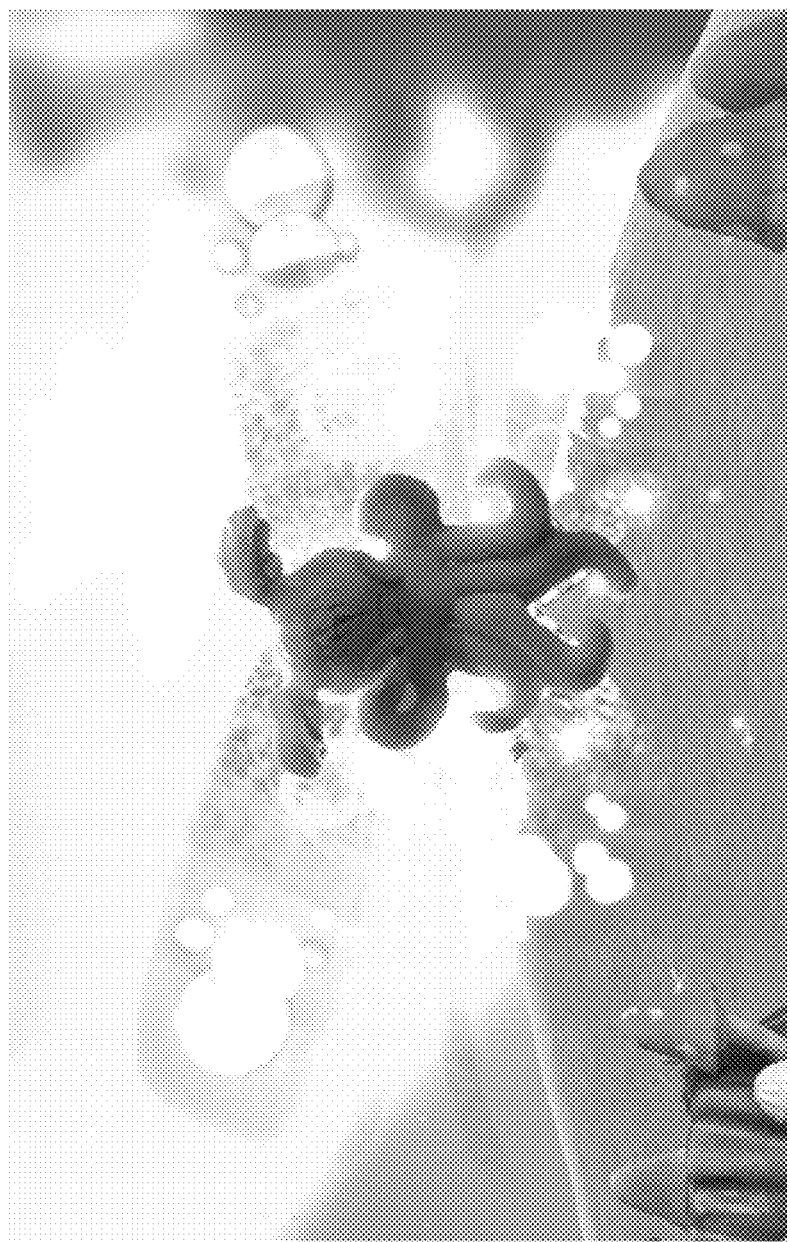
FIG. 27 is a diagram of a final rendering of the digitized object, according to one embodiment.

FIG. 27 shows a final rendering of the digitized object, according to one embodiment. In one embodiment, once the final mesh and texture are complete, an Unreal Engine 3 mesh is created and rendered with environment and rim lighting, self-shadowing, and animation. The GOE app also allows the user to digitize the object by mapping the Nui skeleton onto the skeleton.

The above steps balance usability, CPU/GPU/memory constraints, output quality, artistic concerns, sensor accuracy, and development time. Trade-offs were made that may not be specific to every scenario. As such, different steps could be added or some of the above deleted to improve the speed or quality of the final digitization.

Figure 28:
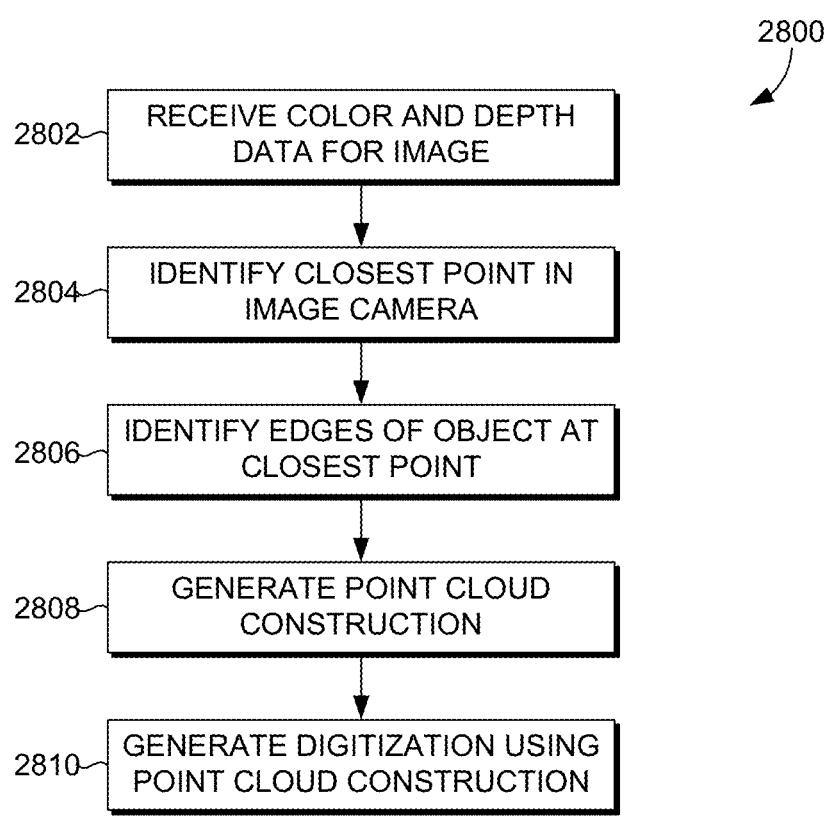
FIG. 28 shows a flow chart detailing a work flow for digitizing an object, according to one embodiment.

FIG. 28 shows a work flow 2800 for digitizing an object, according to one embodiment. Color and depth data for an image are received, as shown at 2802. Analyzing the depth data, an object of interest is found by identifying the closest point of the image to the camera, based on the assumption that a user was most likely presenting the object to the camera for capture. Alternative ways to determine the object of interest may alternatively or additionally be used. Different image-recognition or algorithmic matching techniques may be used to locate an object in an image, as embodiments are not limited to any specific type of means for locating objects in images. Also, embodiments may use the color data of the image in addition or alternative to the depth data to locate an object. For example, a Coca-Cola can may include a trademark color of red, making color data particularly relevant when trying to locate the can in a picture. Thus, the object of interest may be found in many different ways.

Once the object of interest is located, the object's edges are identified, as shown at 2806. Such a determination may be made by analyzing color, depth, or contrast, differences in the image around the object. Once the edges are located, a point cloud construction of the object may be performed using the color and depth data of the image, as shown at 2808. To digitize the object in 3D, multiple point cloud constructions for different sides of the object may be constructed based on color and depth data of multiple images (e.g., back, front, top, bottom, etc.). Multiple point cloud constructions, once created, can be aggregated to create a final digitization of the object, as shown at 2810.

Figure 29:
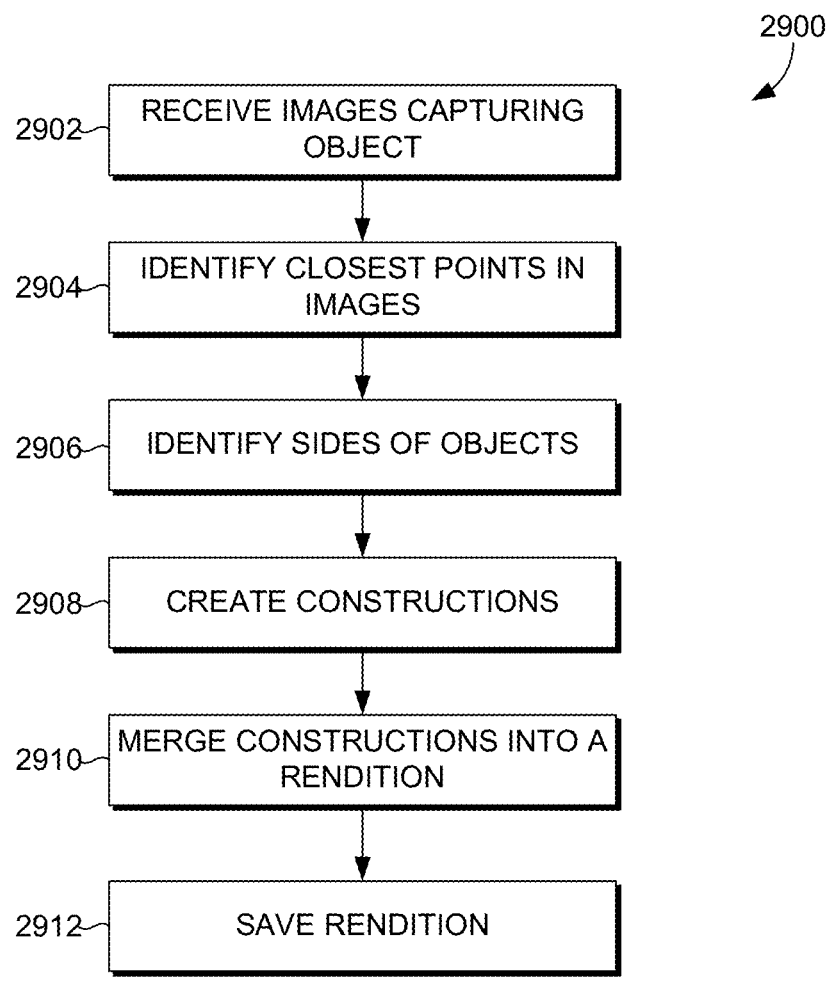
FIG. 29 shows a flow chart detailing a work flow for digitizing an object, according to one embodiment.

FIG. 29 shows a work flow 2900 for digitizing an object, according to one embodiment. Once images of an object are received, as shown at 2902, the closest points of the image are identified, as shown at 2904. Sides of an object (e.g., left, right, north, south, top, bottom, etc.) are identified, as shown at 2906. Point cloud constructions of the images are created, as shown at 2908, and merged into a single rendition, as shown at 2910. The resultant rendition can then be saved, as shown at 2912, and presented on a display device.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A computer-implemented method for generating a rendition of an object, the method comprising:
   receiving images capturing the object from different views;
   in at least two separate images, identifying at least two different sides of the object;
   creating constructions of the at least two different sides of the object from the at least two images;
   determining points of one of the constructions to connect to points of another construction;
   aligning the constructions at the points;
   merging the constructions together into a rendition of the object; and
   storing the rendition of the object.

2. The method of claim 1, wherein the images include a first depth image, and wherein a first side of the object is identified in the first depth image by:
   identifying a closest depth pixel; and
   flood-filling outwardly from the closest depth pixel until depth edges are identified to provide a segmented depth frame comprising a mask of depth pixels for the first side of the object.

3. The method of claim 2, wherein the method further comprises:
   storing the segmented depth frame in a buffer of segmented depth frames; and
   averaging the segmented depth frames to provide a final depth image.

4. The method of claim 1, wherein the images include depth images and color images, and the method further comprises:
   determining offsets between depth pixel coordinates in the depth images and corresponding color pixel coordinates in the color images; and
   employing the offsets during color segmentation and mesh processing when merging the constructions together into the rendition of the object.

5. The method of claim 1, wherein the images include depth images and color images, and the method further comprises providing visual and/or textual feedback for display for positioning the object relative to a camera capturing the depth images based on one or more selected from the following: a distance of at least one depth pixel to the camera capturing the depth images; a distance of at least one depth pixel from a center of a camera view of the camera; pixel stability; and object size.

6. The method of claim 5, wherein the method further comprises:
   determining a distance from ideal value for at least a portion of depth pixels from one or more of the depth images, the distance from ideal value for each depth pixel representing a distance of the depth pixel from an ideal distance from the camera capturing the depth images; and
   wherein the visual feedback provided for display is based on the distance to ideal values.

7. The method of claim 1, wherein creating the constructions comprises:
   generating a first point cloud construction of points in three-dimensional space from a first side of the object; and
   generating a second point cloud construction of points in three-dimensional space from a second side of the object.

8. The method of claim 7, wherein aligning the constructions comprises:
   performing a first transform to rotate the first point cloud construction or the second point construction 180 degrees; and
   performing a second transform to align edges of the first point cloud construction and the second point cloud construction.

9. The method of claim 8, wherein aligning the constructions further comprises matching a center of mass of the first point cloud construction with a center of mass of the second point cloud construction.

10. The method of claim 8, wherein aligning the constructions further comprises performing a brute-force iterate over a range of translations and rotations to minimize an alignment error value computed as a sum of distances between points in the first point cloud construction and closest points in the second point cloud construction.

11. The method of claim 10, wherein aligning the constructions further comprises culling points in the first point cloud construction that do not have corresponding points in the second point cloud construction and culling points in the second point cloud construction that do not have corresponding points in the first point cloud construction.

12. The method of claim 7, wherein merging the constructions together into the rendition of the object comprises generating a final point cloud construction by combining at least some points in the first point cloud construction and at least some points in the second point cloud construction.

13. The method of claim 12, wherein merging the constructions together into a rendition of the object further comprises:
   generating a triangle mesh using the final point cloud construction;
   creating a texture map using a first color image of the first side of the object and a second color image of the second side of the object; and
   applying the texture map to the triangle mesh by mapping texels from the texture map to triangles of the triangle mesh.

14. The method of claim 13, wherein merging the constructions together into a rendition of the object further comprises rounding off sides and removing noise in the triangle mesh.

15. The method of claim 13, wherein merging the constructions together into a rendition of the object further comprises rescaling and positioning the triangle mesh to position bones of a skeleton within the triangle mesh.

16. The method of claim 13, wherein creating the texture map using the first color image and the second color image comprises processing the first color image and the second color image to reduce noise and improve quality by:
   converting colors to linear space;
   computing luma values and chroma values;

applying one or more operations to the luma values and/or the chroma values; and converting back to colors.

17. The method of claim 16, wherein applying one or more operations to the luma values and/or the chroma values comprises at least one selected from the following: applying bilateral filtering to the luma values, applying histogram equalization to the luma values, applying sharpening to the luma values, and applying media filtering to the chroma values.

18. The method of claim 16, wherein processing the first color image and the second color image further comprises:

applying auto-white balance;

repairing edge artifacts; and extending edges of colors outwards into de-segmented regions of the first and second color images.

19. The method of claim 16, wherein processing the first color image and the second color image further comprises filtering edges to replace colors from a background that are not part of the object by:

computing background likelihood values for pixels around edges of the object that reflects a likelihood each of the pixels around the edges of the object are from the background;

identifying high-likelihood-background pixels based on the background likelihood values; and blending the high-likelihood-background pixels toward colors of interior pixels.

20. The method of claim 13, wherein merging the constructions together into a rendition of the object further comprises repairing a seam from merging the constructions together by:

computing a mask value for at least some vertexes in the triangle mesh, the mask value for a given vertex based on how back-facing the given vertex is to the first color image or the second color image;

computing blurred vertex colors; and using the mask values to blend between source texture colors and the blurred vertex colors.

* * * * *